US012142830B2

(12) United States Patent
Hussain

(10) Patent No.: US 12,142,830 B2
(45) Date of Patent: Nov. 12, 2024

(54) WIDE RANGE FREQUENCY TUNABLE CUBESAT ANTENNA

(71) Applicant: KING FAHD UNIVERSITY OF PETROLEUM AND MINERALS, Dhahran (SA)

(72) Inventor: Rifaqat Hussain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 162 days.

(21) Appl. No.: 18/169,570

(22) Filed: Feb. 15, 2023

(65) Prior Publication Data

US 2024/0275062 A1 Aug. 15, 2024

(51) Int. Cl.

*H01Q 13/10* (2006.01)
*H01Q 1/28* (2006.01)
*H01Q 1/48* (2006.01)
*H01Q 5/307* (2015.01)

(52) U.S. Cl.

CPC ........... *H01Q 13/103* (2013.01); *H01Q 1/288* (2013.01); *H01Q 1/48* (2013.01); *H01Q 5/307* (2015.01); *H01Q 13/106* (2013.01)

(58) Field of Classification Search

CPC ........ H01Q 13/103; H01Q 1/288; H01Q 1/48; H01Q 5/307; H01Q 13/106; H01Q 21/064

See application file for complete search history.

(56) References Cited

U.S. PATENT DOCUMENTS

| | | | | |
|---|---|---|---|---|
| 5,754,143 | A * | 5/1998 | Warnagiris | H01Q 9/14 343/895 |
| 8,482,465 | B1 | 7/2013 | Hemmady et al. | |
| 8,686,918 | B1 | 4/2014 | Diaz | |
| 11,450,968 | B1 | 9/2022 | Hussain et al. | |
| 2019/0379135 | A1 | 12/2019 | Sharawi et al. | |
| 2021/0399425 | A1 | 12/2021 | Ying et al. | |

FOREIGN PATENT DOCUMENTS

CN 208352518 U 1/2019

OTHER PUBLICATIONS

Rifaqat Hussain, et al., "A Compact Sub-GHz Wide Tunable Antenna Design for IoT Applications", Electronics, vol. 11, No. 1074, Mar. 29, 2022, pp. 1-14.

* cited by examiner

*Primary Examiner* — Daniel D Chang
(74) *Attorney, Agent, or Firm* — Oblon, McClelland, Maier & Neustadt, L.L.P.

(57) ABSTRACT

A frequency reconfigurable (FR) slot-based UHF antenna for use in Cube-Sat is described. The antenna includes a dielectric circuit board, a metallic layer, a meandered slot line formed in the metallic layer, a feed horn is connected to a first edge of the circuit board, a reverse biased varactor diode, a ground terminal connected to the metallic layer and a biasing circuit configured to bias the reverse biased varactor diode. The biasing circuit causes the antenna to resonate in a frequency range of 300 MHz to 450 MHz. The meandered slot line includes a heptagonal path connected to and enclosing a rectangular path. An open end of the feed horn is directed towards the apex of the heptagonal path. The reverse biased varactor diode is connected to the metallic layer across the rectangular path and parallel to a central axis.

20 Claims, 9 Drawing Sheets

WIDE RANGE FREQUENCY TUNABLE CUBESAT ANTENNA

STATEMENT OF ACKNOWLEDGEMENT

The inventor(s) acknowledge the financial support provided by the King Fahd University of Petroleum and Minerals (KFUPM), Riyadh, Saudi Arabia through Project #SR201009.

BACKGROUND

Technical Field

The present disclosure is directed to a wide range frequency tunable CubeSat antenna.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Satellite communication is a high-speed wireless communication technology for high capacity data transmission. Satellite communication involves transmission of signals from a ground station to a satellite and vice versa. Satellite communication may be intended to provide communication services between two points on Earth such as point-to-point services (e.g., Internet, satellite phones) and point-to-multipoint (broadcast) services (e.g., television). Traditional satellite systems are relatively large in physical size and complex in operation. However, recent developments have led to smaller, lightweight, and simplified satellite systems, such as pico-class satellites or cube satellites (CubeSats). CubeSats are economical and easy to manufacture as compared to the conventional satellite systems. The CubeSats are limited in size and as a result, compact subsystems have challenging requirements for use in CubeSats. For performing various functions, the CubeSat includes one or more transceiver antennas to support communications. In satellite systems, antenna design is a key component for both upstream and downstream communication that connects ground stations with satellites. The design of an antenna for the CubeSat has stringent limitations due to the size constraints that define its design space. A compact antenna is required which maintains good radiation performance and basic antenna characteristics, such as input impedance matching, bandwidth, and peak gain requirements.

Conventionally, CubeSats operate at 437 MHz, i.e., the amateur UHF band, which permits seamless uplink and downlink communications and allows one Cube-Sat to interconnect with other CubeSats in a network. CubeSat antenna configurations in the UHF range provide both planar and non-planar geometries. Patch and slot antennas are generally used for linking CubeSats in orbit with ground stations on Earth because of their reduced size, compactness, resilience, and simplicity of manufacturing. They also have minimal radiation loss, lower dispersion, and simple matching of input impedance. In the S, C, and X bands, patch antennas and slot-based antennas with planar configuration have been employed. Conventionally, both planar and non-planar antennas are suitable for the CubeSats at UHF band. Planar antennas are more preferable as they can be readily integrated with other existing radio frequency (RF) and microwave circuits. Also, various patch antennas with planar geometry are also available to operate in UHF, L, S, C and X band. However, the larger size of these patch antennas is a major drawback.

A conventional miniaturized folded slot antenna has been described that employed an inductor to shorten a slot line with an electrical length of $\lambda/4$. The miniaturized folded slot antenna operates at 300 MHz with dimensions of $5.5\times5.5\times0.787$ cm$^3$. However, the miniaturized folded slot antenna has small bandwidth (4.8 MHz). (See: Azadegan, R. E. Z. A., and K. A. M. A. L. Sarabandi, "*Miniaturized folded-slot: An approach to increase the bandwidth and efficiency of miniaturized slot antennas*," IEEE Antennas and Propagation Society International Symposium (IEEE Cat. No. 02CH37313), vol. 4, pp. 14-17. IEEE, 2002, incorporated herein by reference in its entirety).

Further, a conventional circularly polarized UHF antenna was described that integrated two meander-line slot antennas. The two meander-line slot antennas work at UHF frequencies of 485 MHz and 500 MHz, respectively. The circularly polarized UHF has a gain and reflection coefficients, in the UHF band (485 and 500 MHZ), of 2.73 dB and −13.6 dB and −15 dB for uplink and downlink, respectively. A desired frequency may be obtained by carefully adjusting the meander parts, thereby limiting the adoption in the CubeSats. (See: Tariq, Salahuddin, and Reyhan Baktur, "*Conformal circularly polarized UHF slot antenna for CubeSat missions*," in Progress In Electromagnetics Research C 111 (2021): 73-82, is incorporated herein by reference in its entirety).

Another conventional miniaturized planar meander line antenna was described. The size of the antenna is $50\times80\times1.635$ mm$^3$ with a gain of 1.8 dB. The simulated and measured S1 curves are −33.53 dB and −19 dB, respectively. (See: Zalfani, Nozha, Sabri Beldi, Samer Lahouar, and Kamel Besbes, "*A miniaturized planar meander line antenna for UHF CubeSat communication*," in Advances in Space Research 69, no. 5 (2022): 2240-2247, incorporated herein by reference in its entirety).

A compact UHF printed antenna was described that provides a solution for reduced size compared to a reference antenna by using a slot-based antenna at 401 MHz with 8 MHz bandwidth. The antenna has dielectric dimensions of $76.6\times162.25$ mm$^2$. (See: Vieira, Juner M., Rodrigo Facco, and Marcos VT Heckler, "*Compact UHF Printed Antennas for Nano-Satellites*," in 2020 14th European Conference on Antennas and Propagation (EuCAP), pp. 1-5. IEEE, 2020, is incorporated herein by reference in its entirety). However, the antennas described in these references and other conventional antennas suffer from various limitations including linear polarization, low directivity, poor bandwidth and limited gain.

Due to fast growing CubeSat applications, a reconfigurable antenna system is required in the CubeSat. There are several reconfiguration strategies for designing reconfigurable antennas. To modify the parameters of the antenna, reconfiguration approaches employ electrical switches, mechanical actuators, or changes in material properties.

Hence, there is a need for a frequency reconfigurable (FR) slot-based ultra-high frequency (UHF) antenna that has compact size, planar geometry, enhanced radiation efficiency and enhanced frequency reconfigurability.

SUMMARY

In an exemplary embodiment, a frequency reconfigurable (FR) slot-based ultra-high frequency (UHF) antenna for use in cubic shaped satellites (Cube-Sat) is described. The frequency reconfigurable (FR) slot-based ultra-high frequency (UHF) includes a dielectric circuit board, a metallic layer, a meandered slot line, a feed horn, a reverse biased varactor diode, a ground terminal, and a biasing circuit. The dielectric circuit board has a surface dimension of about 100 mm in length and about 100 mm in width. The dielectric circuit board has a top side, a bottom side, a first edge opposite a second edge, and a third edge opposite a fourth edge. The metallic layer is configured to cover the top side of the dielectric circuit board. The meandered slot line is formed in the metallic layer. The meandered slot line comprises a heptagonal path connected to and enclosing a rectangular path. The meandered slot line is configured to have mirror image geometry about a central axis which extends from the first edge to the second edge, passes through an apex of the heptagonal path and bisects the rectangular path. The feed horn is connected to the first edge of the circuit board, wherein an open end of the feed horn is directed towards the apex of the heptagonal meandered path. The reverse biased varactor diode is connected to the metallic layer across the rectangular path and parallel to the central axis. The ground terminal is connected to the metallic layer. The biasing circuit is configured to bias the reverse biased varactor diode and cause the frequency reconfigurable (FR) slot-based ultra-high frequency (UHF) antenna to resonate in a frequency range of 300 MHz to 450 MHz.

In another exemplary embodiment, a method of forming a frequency reconfigurable (FR) slot-based ultra-high frequency (UHF) antenna for use in cubic shaped satellites (Cube-Sat) is described. The method includes obtaining a dielectric circuit board having a surface dimension about 100 mm in length and about 100 mm in width, a top side, a bottom side, a first edge opposite a second edge, and a third edge opposite a fourth edge. The method includes covering the dielectric circuit board with a metallic layer. The method includes etching, by laser milling, a meandered slot line in the metallic layer, wherein the meandered slot line comprises a heptagonal path connected to and enclosing a rectangular path, wherein the meandered slot line is configured to have mirror image geometry about a central axis which extends from the first edge to the second edge, passes through an apex of the heptagonal path and bisects the rectangular path. The method includes connecting a feed horn to the first edge of the circuit board, wherein an open end of the first feed horn is directed towards the apex of the heptagonal meandered path. The method includes connecting a reverse biased varactor diode to the metallic layer across the rectangular path and parallel to the central axis. The method includes forming a biasing circuit on the bottom side, wherein the biasing circuit is configured to bias the reverse biased varactor diode. The method includes connecting a voltage supply to the biasing circuit. The method includes connecting a ground terminal connected to the metallic layer, wherein the antenna resonates in a frequency range of 300 MHz to 450 MHz.

In another exemplary embodiment, a method for transmitting ultra-high frequency (UHF) signals with a frequency reconfigurable (FR) slot-based ultra-high frequency (UHF) antenna for use in cubic shaped satellites (Cube-Sat) is described. The method incudes connecting a source of the ultra-high frequency (UHF) signals to a feed horn located on a frequency reconfigurable (FR) slot-based ultra-high frequency (UHF) antenna, wherein the frequency reconfigurable (FR) slot-based ultra-high frequency (UHF) antenna includes a dielectric circuit board, wherein the dielectric circuit board has a surface dimension of about 100 mm in length and about 100 mm in width, a top side, a bottom side, a first edge opposite a second edge, and a third edge opposite a fourth edge; a metallic layer configured to cover the top side of the dielectric circuit board; a meandered slot line formed in the metallic layer, wherein the meandered slot line comprises a heptagonal path connected to and enclosing a rectangular path, wherein the meandered slot line is configured to have mirror image geometry about a central axis which extends from the first edge to the second edge, passes through an apex of the heptagonal path and bisects the rectangular path; a reverse biased varactor diode connected to the metallic layer across the rectangular path and parallel to the central axis; and a ground terminal connected to the metallic layer. The method incudes positioning the feed horn to direct an open end of the feed horn towards the apex of the heptagonal meandered path. The method incudes biasing, with a biasing circuit, the reverse biased varactor diode to cause the frequency reconfigurable (FR) slot-based ultra-high frequency (UHF) antenna to resonate in a frequency range of 300 MHz to 450 MHz.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
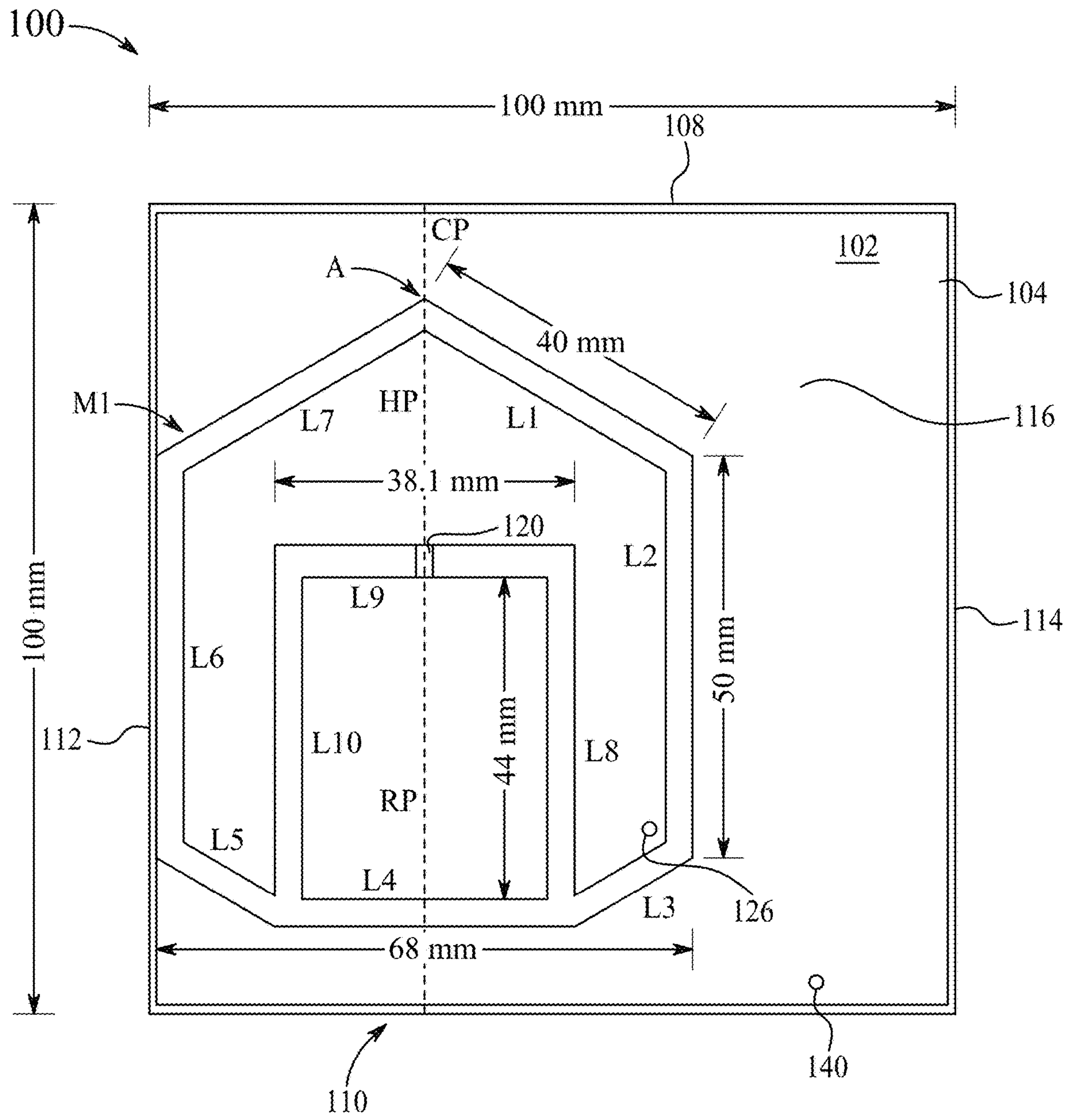
FIG. 1A is a top view of a frequency reconfigurable (FR) slot-based ultra-high frequency (UHF) antenna, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a frequency reconfigurable (FR) slot-based antenna for CubeSat applications that operate in the UHF band. The present disclosure includes a highly miniaturized FR slot-based antenna (also referred to as meandered loop slot-line antenna) with pattern diversity. The FR slot-based antenna is intended for one unit (1U) of a CubeSat. In a meandered loop slot-line antenna, antenna miniaturization is achieved by folding a meandered slot-line, together with a capacitive loading. The FR slot-based antenna is characterized by its planar geometry, wideband operation, pattern diversity, and extremely down-sized structure. In an example, each folded meandered slot is 80×68 $mm^2$ in size and operates in a frequency range of 300-450 MHz. The FR slot-based antenna is integrated on a Rogers RO4350 substrate. Further, in the FR antenna, a single varactor diode is used to sweep the frequency of the FR antenna. The FR antenna includes a small-sized meandered loop-slot. The described FR antenna with frequency reconfigurability is ideally suited for small satellite applications in the UHF band, especially CubeSats.

Small satellites, CubeSats, have a promising future in the field of satellite communication as they are quickly enabled and easily affordable for technological demonstration, scientific study, and educational space programs. A standard size of the 1U of CubeSat is about 100×100×100 $mm^3$. The 1U CubeSat may be easily assembled to generate a large size assembly having up to 12U. CubeSats are capable of performing all of the basic operations of conventional satellites including altitude monitoring and control, and uplink and downlink communications. The energy requirement of the CubeSat is met by a battery unit and a plurality of solar panels, which are installed on the body of the CubeSat.

In various aspects of the disclosure, definitions of one or more terms that will be used in the document are provided below.

The term "decibel (or dB)" is a unit used to measure the ratio of input to output power. dB measures the intensity of the power level of an electrical signal by comparing it to a given scale. For example, an amplifier causes a gain in power measured in decibels and it is indicated by a positive number. In another example, cables can cause a loss of power. This is measured in negative dB.

FIG. 1A-FIG. 1D illustrate an overall configuration of a frequency reconfigurable (FR) slot-based ultra-high frequency (UHF) antenna for use in cubic shaped satellites (Cube-Sat).

Figure 1B:
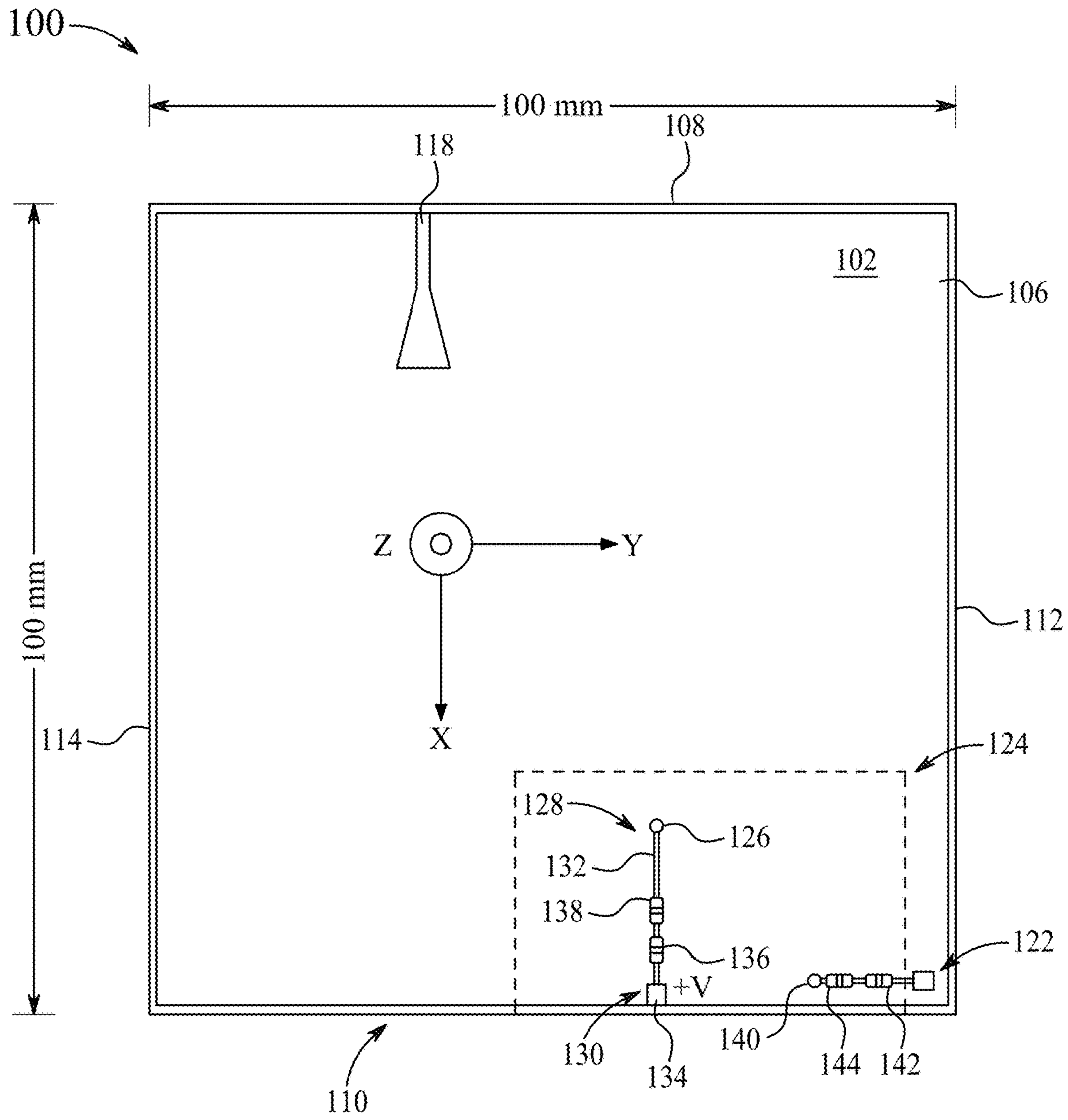
FIG. 1B is a bottom view of the FR slot-based UHF antenna, according to certain embodiments.

FIG. 1A illustrates a top view (front view or front side) of the FR slot-based UHF antenna 100 (hereinafter interchangeably referred to as "the UHF antenna 100"). FIG. 1B is a bottom view (back view or back side) of the UHF antenna 100.

Figure 1C:
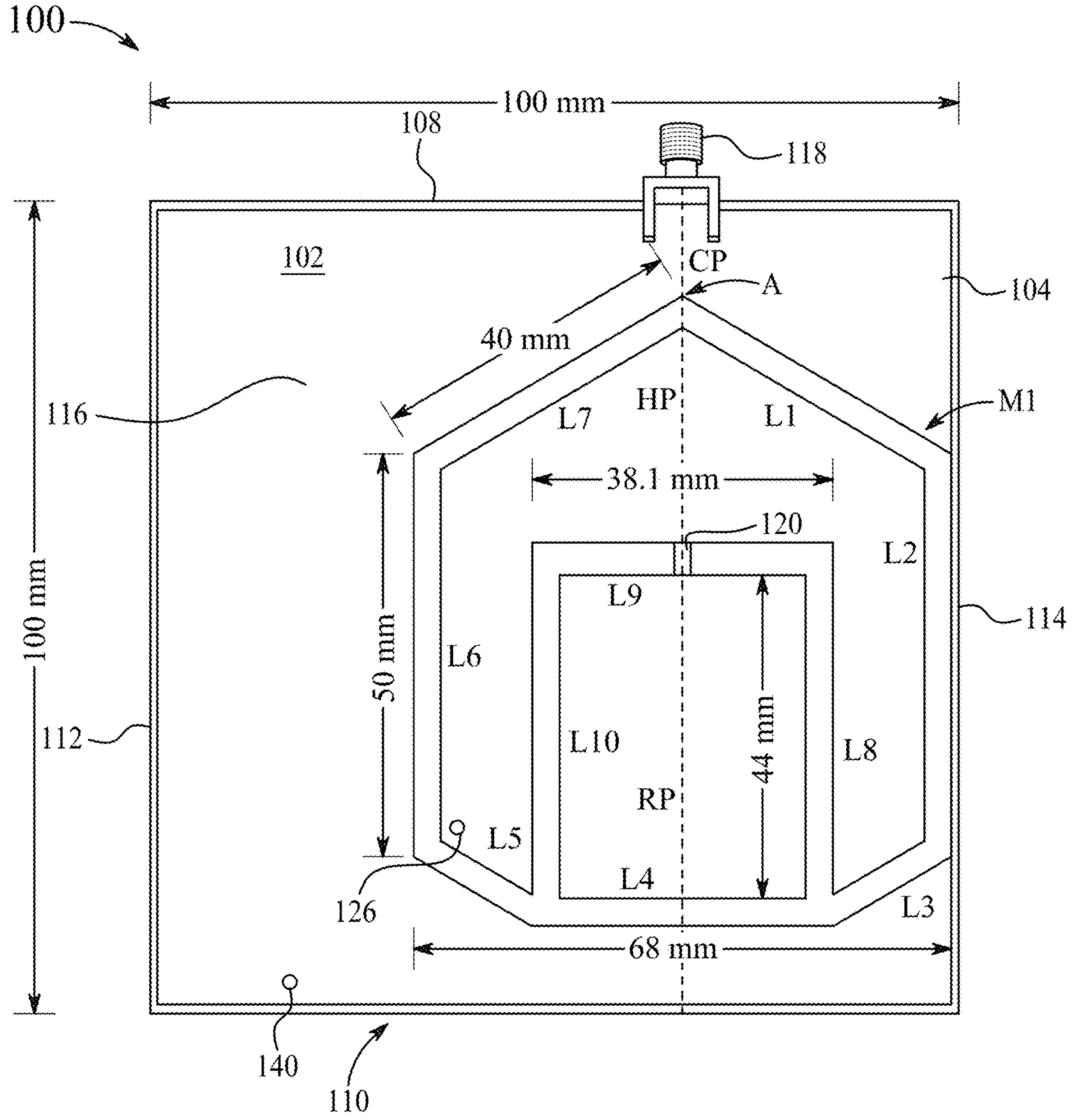
FIG. 1C is a top view of a fabricated FR slot-based UHF antenna, according to certain embodiments.
Figure 1D:
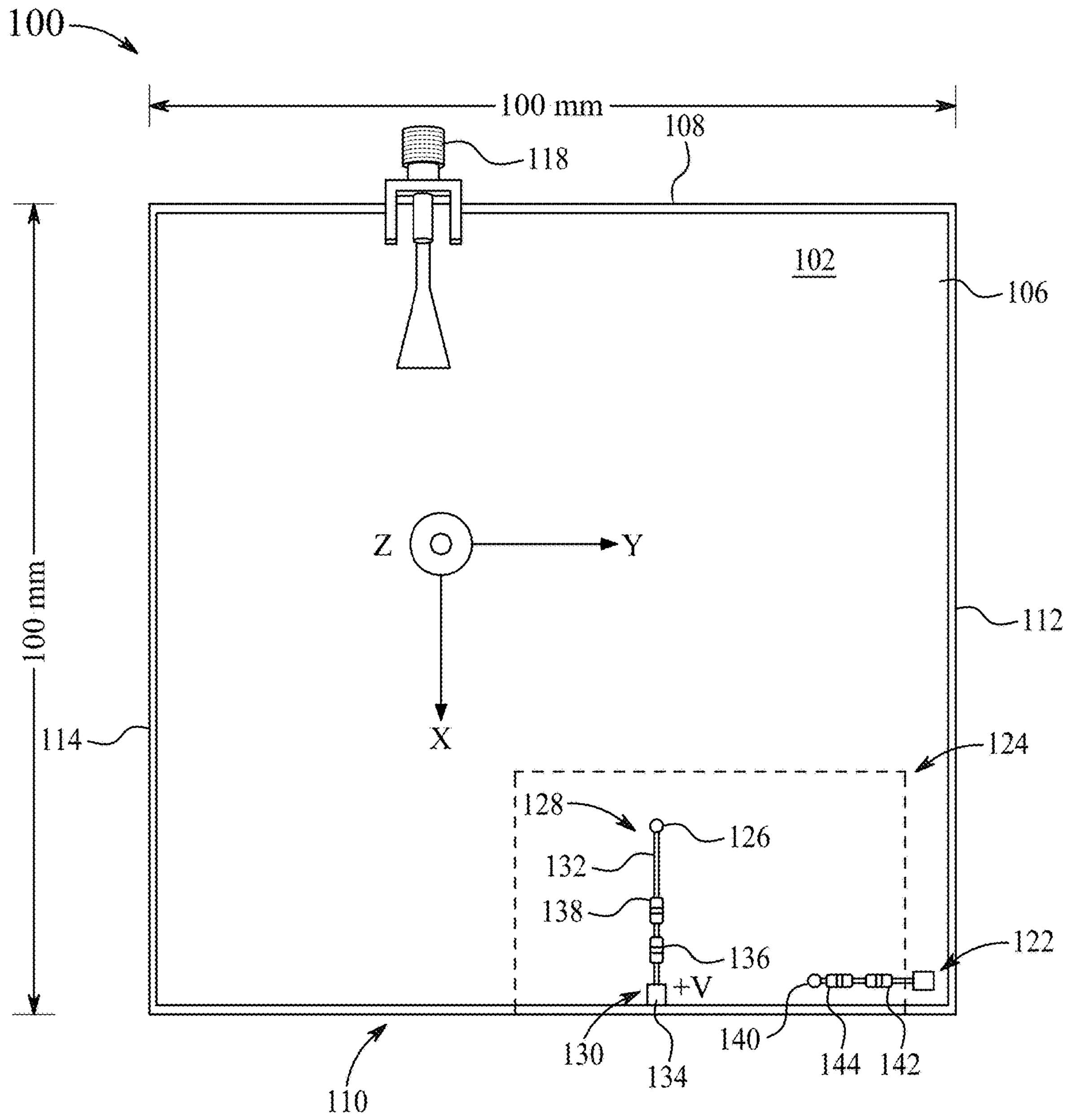
FIG. 1D is a bottom view of the fabricated FR slot-based UHF antenna, according to certain embodiments.

FIG. 1A may be read in conjunction with FIG. 1B—FIG. 1D for a better understanding. In the drawings of FIG. 1A—FIG. 1D, dimensions shown are for the example of a 100×100 $mm^2$ circuit board and should not be construed as limiting. For a circuit board less than 100×100 $mm^2$, the dimensions are proportionately smaller.

The UHF antenna 100 includes a dielectric circuit board 102, a metallic layer 116, a meandered slot line M1, a feed horn 118, a reverse biased varactor diode 120, a ground terminal 122, and a biasing circuit 124.

The dielectric circuit board 102 has a surface dimension of about 100 mm in length and about 100 mm in width. The dielectric circuit board 102 has a top side 104, a bottom side 106, a first edge 108, a second edge 110, a third edge 112, and a fourth edge 114. The first edge 108 is opposite to the second edge 110. The third edge 112 is opposite to the fourth edge 114. In an example, the dielectric circuit board 102 is a Rogers RO4350 substrate (fabricated by Roger cooperation, located at 2225 W Chandler Blvd, Chandler, AZ 85224). In an example, the dielectric circuit board 102 uses a substrate material (Rogers RO4350 substrate) having a relative permittivity (Er) of 3.48 and loss tangent of 0.0036.

The metallic layer 116 is configured to cover the top side 104 of the dielectric circuit board 102. For example, the metallic layer 116 is copper. In the metallic layer 116, one meandered slot line M1 is formed. For example, the meandered slot line M1 is fabricated on the metallic layer 116 using a printed circuit board (PCB) laser etching and milling machine (for example, LPKF Prototyping machine manufactured by LPKF Laser & Electronics, located at Osteriede 7, 30827 Garbsen, Germany).

The meandered slot line M1 includes a heptagonal path (HP) and a rectangular path (RP). The heptagonal path (HP) is configured to connect to and enclose the rectangular path (RP). The meandered slot line M1 is configured to have mirror image geometry about a central axis (CP). The meandered slot line M1 extends from the first edge 108 to the second edge 110, passes through an apex (A) of the heptagonal path (HP) and bisects the rectangular path. In an example, the meandered slot line M1 has dimensions of about 80 mm×68 mm. In an example, the meandered slot line M1 is about 2 mm in width. In the present UHF antenna 100, the meandered slot line M1 is used to tune the antenna 100 to multiple frequency bands. Various frequency bands are obtained by changing the capacitance value loading of the meandered slot line M1 using the reverse biased varactor diode 120.

In some examples, each antenna element (heptagonal path (HP) and the rectangular path (RP)) may be configured to operate as a transmitting antenna or as a receiving antenna. In some cases, the first antenna element (heptagonal path (HP)) is configured to operate as the transmitting antenna, and the second antenna element (rectangular path (RP)) is configured to operate as the receiving antenna. In some examples, each antenna element is configured to operate as the transmitting antenna as well as the receiving antenna.

As shown in FIG. 1A, the heptagonal path (HP) includes a plurality of connected legs (L1-L7). For example, the plurality of connected legs include seven legs (L1-L7) having a first leg (L1), a second leg (L2), a third leg (L3), a fourth leg (L4), a fifth leg (L5), a sixth leg (L6), and a seventh leg (L7). The heptagonal path (HP) operates at a frequency of 300 MHz.

The first leg L1 extends from the apex (A) to the fourth edge 114 at a first angle. For example, the first angle is about 30 degrees with respect to a line which extends from the third edge 112 to the fourth edge 114. The second leg L2 is connected to the first leg. The second leg L2 extends parallel to the fourth edge 114. The third leg L3 is connected to the second leg L2. The third leg L3 forms a second angle with the second leg L2, and extends towards the third edge 112. For example, the second angle is about 30 degrees. The fourth leg L4 is connected to the third leg L3. The fourth leg L4 extends towards the third edge 112 and is parallel to the second edge 110. The fifth leg L5 is connected to the fourth leg L4. The fifth leg L5 forms a third angle with the fourth leg L4, and extends towards the third edge 112. The third angle is a negative of the second angle. The sixth leg L6 is connected to the fifth leg L5. The sixth leg L6 extends towards the first edge 108. The seventh leg L7 is connected to the sixth leg L6 at an angle equal to a negative of the first angle. The seventh leg L7 is connected to the first leg L1 at the apex (A).

As shown in FIG. 1A, the rectangular path (RP) includes a plurality of connected legs. For example, the plurality of connected legs include four legs having the fourth leg (L4), an eighth leg (L8), a ninth leg (L9), and a tenth leg (L10).

The eighth leg L8 is connected to an intersection of the fourth leg L4 and the third leg L3. The eighth leg L8 extends from the fourth leg L4 towards the first edge 108 for about 55% of a distance between the fourth leg L4 and the apex (A). The ninth leg L9 is connected to the eighth leg L8 at a right angle. The ninth leg L9 extends from the eighth leg L8 towards the third edge 112. The ninth leg L9 is broken by a gap located at the central axis (CP), wherein the gap is about 1 mm in width. The tenth leg L10 is connected at a first end to the ninth leg L9 at a right angle. The tenth leg L10 extends from the ninth leg L9 towards the second leg L2. The tenth leg L10 is connected at a second end to an intersection of the fourth leg L4 and the fifth leg L5.

The ground terminal 122 is connected to the metallic layer 116.

As shown in FIG. 1B-FIG. 1D, the feed horn 118 is connected to the first edge 108 of the dielectric circuit board 102. The feed horn 118 is configured to connect with a source of the UHF signals and to receive the UHF signals to be fed to the UHF antenna 100. In a structural aspect, an open end of the feed horn 118 is directed towards the apex (A) of the heptagonal meandered path (HP). The feed horn 118 is configured to couple a waveguide to, for example, a parabolic dish antenna or offset dish antenna for reception or transmission of microwave signals. The feed horn 118 minimizes the mismatch loss between the UHF antenna 100 and the waveguide. In an example, the feed horn 118 is a separate part configured to be attached to the UHF antenna 100 during fabrication. In some examples, the feed horn 118 is pre-fabricated/integrated with the UHF antenna 100.

The reverse biased varactor diode 120 is connected to the metallic layer 116 across the rectangular path (RP) and in parallel to the central axis (CP). In an example, the reverse biased varactor diode 120 is a SMV 1233 varactor diode (fabricated by Skyworks Solutions, Inc., located at 5260 California Ave, Irvine, CA 92617, USA). The reverse biased varactor diode 120 (SMV1233) has a maximum reverse bias current of 20 nA. From the maximum current specifications, the maximum biasing circuit power loss of the reverse biased varactor diode 120 is −87.7 dBm. The reverse biased varactor diode 120 is connected from the back side (bottom side) through vias in the dielectric circuit board 102 to ground plane (ground terminal 122) on the front side (top side). The two terminals of the reverse biased varactor diode 120 are connected to the rectangular path (RP). The reverse biased varactor diode 120 is a type of diode whose internal capacitance varies with respect to the reverse voltage. The reverse biased varactor diode 120 is located in the gap in the ninth leg L9 at the central axis (CP). In an example, the reverse biased varactor diode 120 is selected to have a capacitance value in the range of 1.32 picoFarads to 9.63 picoFarads. For example, the reverse biased varactor diode 120 is selected to have a capacitance value of about 5.39 picoFarads.

The biasing circuit 124 is configured to bias the reverse biased varactor diode 120 and cause the UHF antenna 100 to resonate in the frequency range of 300 MHz to 450 MHz. The biasing circuit 124 includes RF chokes (136 and 142), and current limiting resistors (138 and 144).

As shown in FIG. 1B and FIG. 1D, the biasing circuit 124 includes a first metallic sorting post 126, a second metallic sorting post 140, a microstrip feedline 128, a voltage source 134, a first inductor 136, a first resistor 138, a second inductor 142, and a second resistor 144.

The first metallic sorting post 126 is located on the bottom side 106. The first metallic sorting post 126 is configured to extend through the dielectric circuit board 102 and connect to the reverse biased varactor diode 120 on the top side 104. The second metallic sorting post 140 is located on the bottom side 106. The second metallic sorting post 140 is configured to extend through the dielectric circuit board 102 and connect to the metallic layer 116 on the top side 104.

The first metallic sorting post 126 and the second metallic sorting post 140 are used to connect the reverse biased varactor diode 120 and the biasing circuit 124. The reverse biased varactor diode 120 is configured to function as a DC blocking capacitor. The DC blocking capacitor is a component that prevents the flow of DC signals into the UHF antenna 100 while allowing higher frequency RF signals to pass through.

The microstrip feedline 128 is located on the bottom side 106. The microstrip feedline 128 is configured to have a first end 130 at the second edge 110 and a second end 132.

The voltage source 134 is connected to the first end 130 of the microstrip feedline 128.

The first inductor 136 is connected in series with the voltage source 134. The second inductor 142 is connected to the ground terminal 122. Each of the first inductor 136 and the second inductor 142 is configured to separate the UHF antenna 100 (radiating structure) from the voltage source 134.

The first resistor 138 is connected in series with the second inductor 142. The second end of the microstrip feedline 128 is connected to the first metallic sorting post 126. The second resistor 144 is connected in series with the second inductor 142. The second resistor 144 is connected to the second metallic sorting post 140.

In the present UHF antenna 100, the biasing circuit 124 and the antenna elements (heptagonal path (HP) and the rectangular path (RP)) are well isolated and have a tuning effect on the antenna's performance.

FIG. 1C is a top view of a fabricated UHF antenna 100. FIG. 1D is a bottom view of the fabricated UHF antenna 100. The UHF antenna 100 was fabricated using a laser milling machine (for example, the LPKF S104, manufactured by LPKF Laser & Electronics, located at Osteriede 7, 30827 Garbsen, Germany).

From the fabricated UHF antenna 100, it was concluded that an increase in the length of the meandered slot line M1 increased the electrical length of the UHF antenna 100, causing the UHF antenna 100 to resonate at a lower frequency range. In addition, variations in the width of the meandering slot line M1 caused poor matching. In an example, a defined width (to achieve matching) of the meandered slot line M1 provides the finest Zin matching.

The following examples are provided to illustrate further and to facilitate the understanding of the present disclosure.

During experimentation, the UHF antenna 100 was stimulated using HFSS (High Frequency Structure Simulator). The fabricated UHF antenna 100 was characterized for S-parameters using vector network analyzer (for example, Agilent FieldFox RF Vector Network Analyzer manufactured by Agilent Technologies, Inc., located at 5301 Stevens Creek Blvd. Santa Clara, CA, United States of America).

The fabricated UHF antenna 100 was developed, evaluated and analyzed using an Ansys Electromagnetics Suite.

The Ansys Electromagnetics Suite (Ansys Electronics Desktop (AEDT) developed by Ansys, Inc., Southpointe 2600 Ansys Drive Canonsburg, PA 15317 USA) is a platform that enables electronic system design. AEDT provides access to the industry gold-standard Ansys simulators for work with antenna, RF, microwave, PCB, integrated circuit (IC) and IC package designs, along with electromechanical devices such as electric motors and generators. The parameters of the folded slot elements, feed structure, and the capacitance values were carefully tuned to achieve the compact UHF antenna 100 to cover 300-450 MHz frequency band. The frequency band of the UHF antenna 100 may still be controlled to shift further towards lower frequencies or towards higher frequencies by adjusting only the capacitance value. Hence, the UHF antenna 100 has the adaptability and flexibility to be used in other frequency bands.

Figure 2A:
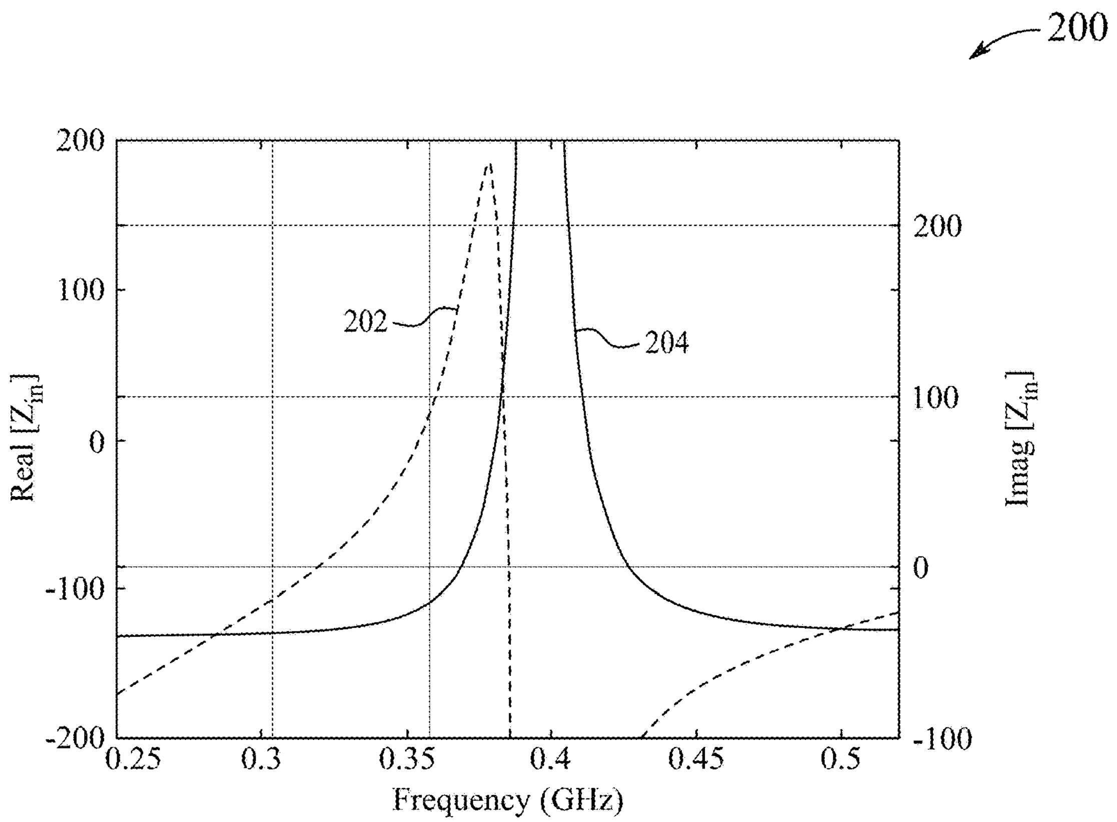
FIG. 2A is a graph of input impedance Zin of the FR slot-based UHF antenna without capacitor, according to certain embodiments.

FIG. 2A is a graph 200 of an input impedance $Z_{in}$ of the UHF antenna 100 without a capacitor. FIG. 2A illustrates the real ($R_e$) and imaginary ($I_m$) components of the input impedance ($Z_{in}$) without the capacitor. Signal 202 illustrates a real part of the impedance. Signal 204 illustrates an imaginary part of the impedance.

Figure 2B:
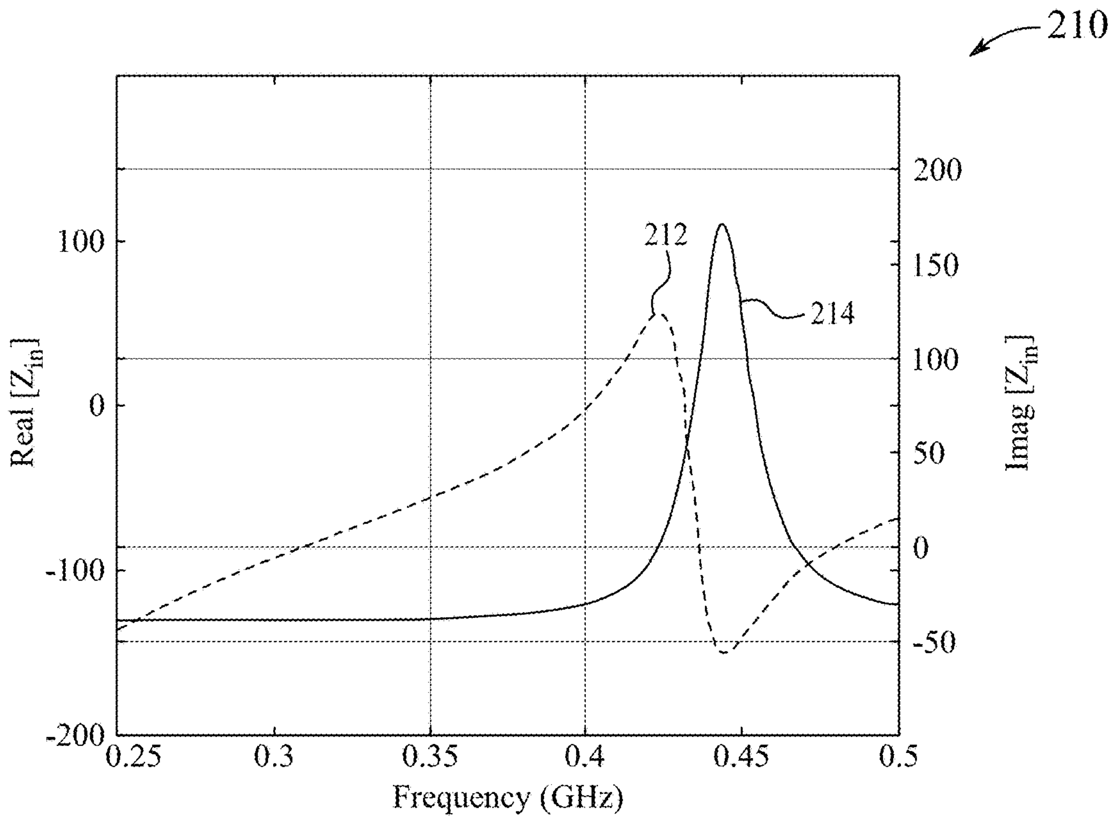
FIG. 2B is a graph of the input impedance Zin of the FR slot-based UHF antenna with capacitor, according to certain embodiments.

FIG. 2B is a graph 210 of an input impedance $Z_{in}$ of the UHF antenna 100 with a capacitor. Signal 212 illustrates a real part of the impedance (Imag$\{Z_{in}\}$). Signal 214 illustrates an imaginary part of the impedance (Real $\{Z_{in}\}$).

As shown in FIG. 2A-FIG. 2B, the $R_e\{Z_{in}\}$ is approximately 5002, and the Imag$\{Z_{in}\}$ is approaching zero at the resonating bands. The antenna's reduced size and diode arrangement resulted in a continuous frequency sweep from 300-450 MHz, which may accommodate diverse narrowband operations for CubeSat applications. The capacitive loading aids in matching the $Z_{in}$ at different resonant bands for various reverse bias voltages across the varactor diode. In an example, the UHF antenna 100 is made up of a matched 50 22 input impedance ($Z_{in}$).

Figure 3A:
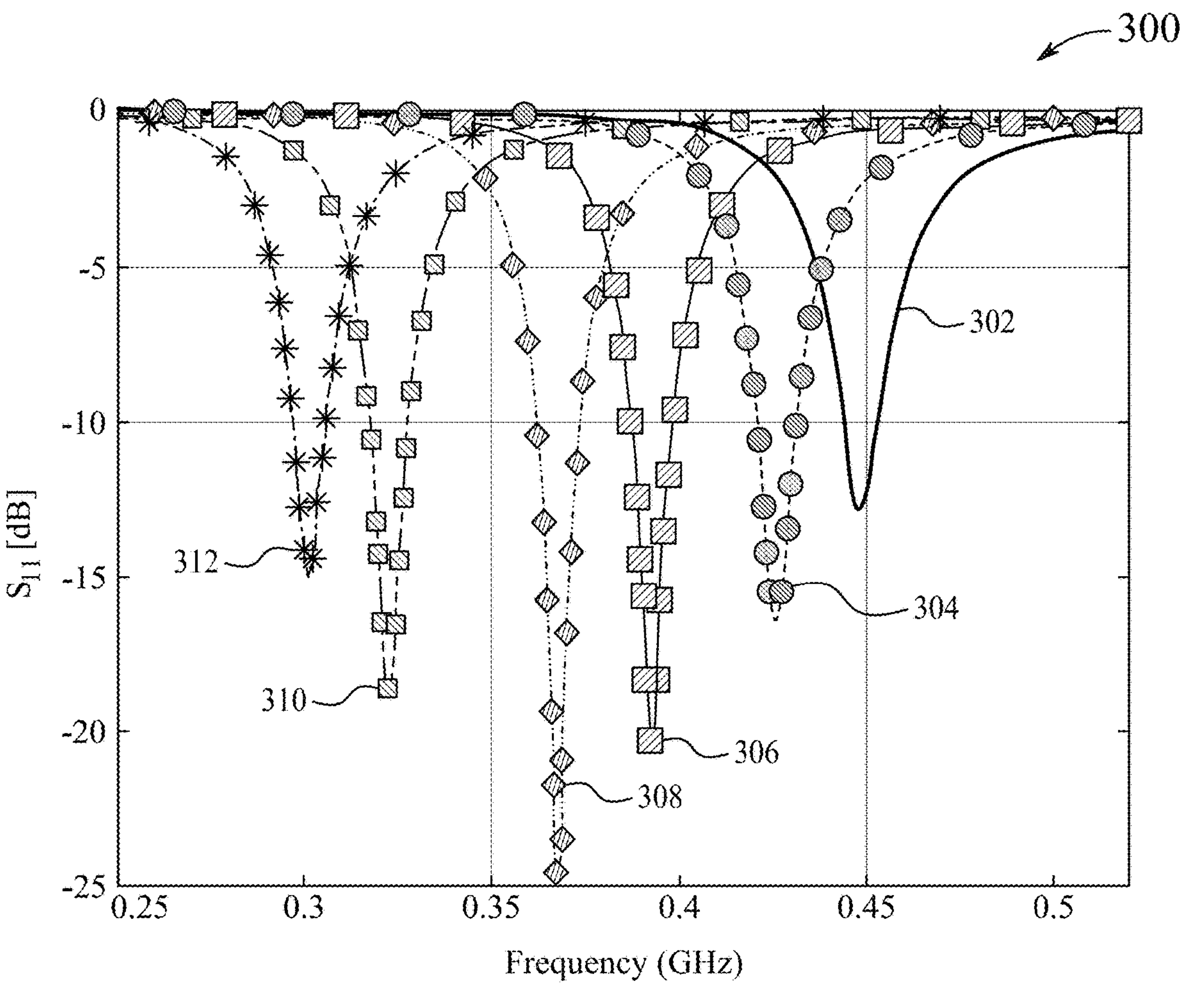
FIG. 3A is a graph of the simulated reflection coefficient curves having s-parameters ($S_{11}$), according to certain embodiments.
Figure 3B:
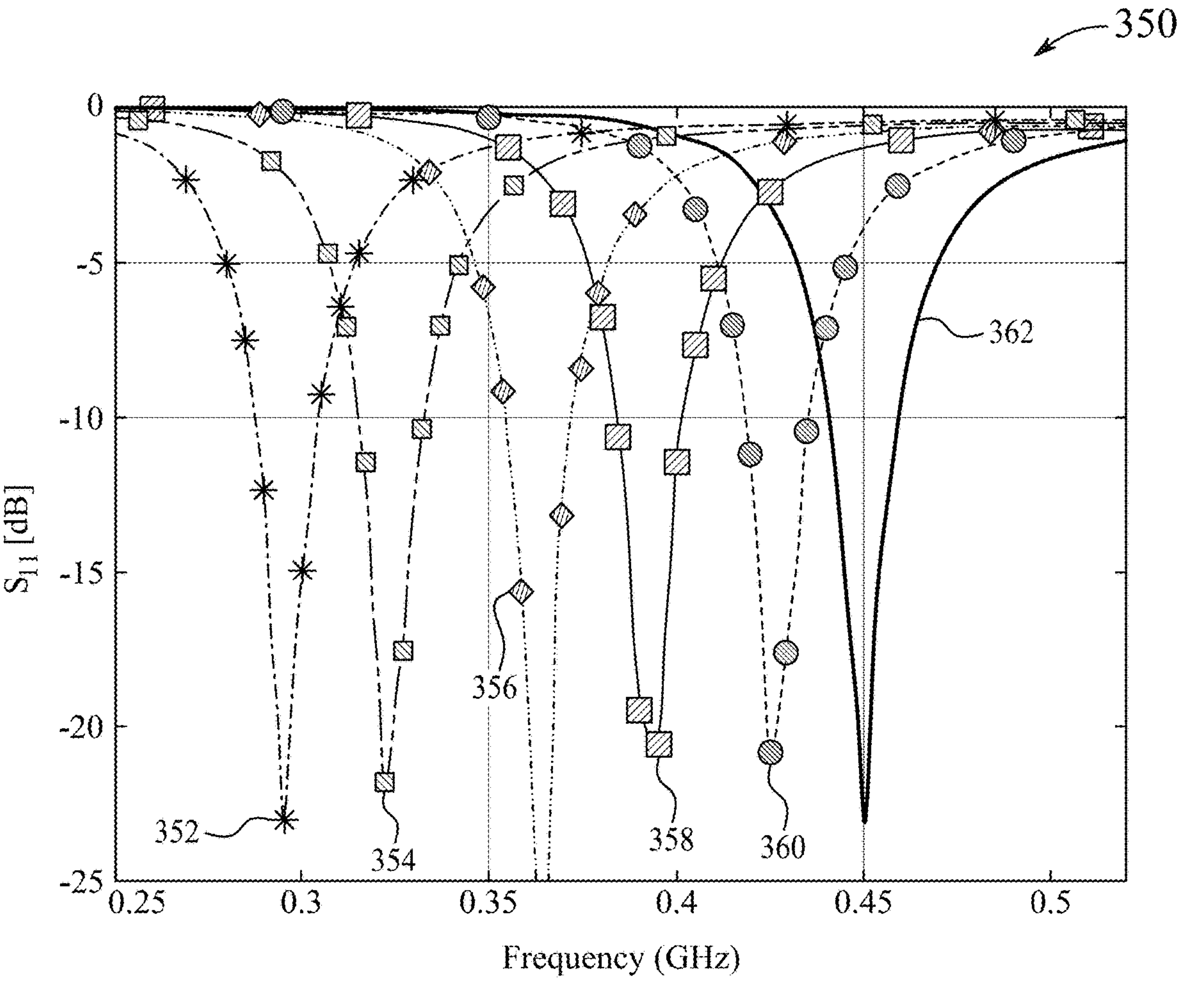
FIG. 3B is a graph of the measured reflection coefficient curves having s-parameters ($S_{11}$), according to certain embodiments.

FIG. 3A and FIG. 3B depict the simulated and measured reflection coefficient curves ($S_{11}$) for the UHF antenna 100. FIG. 3A is a graph 300 of a simulated reflection coefficient curves having s-parameters ($S_{11}$) when the reverse biased varactor diode 120 has different capacitance values. The S-parameters describe the input-output relationship between ports (or terminals) in an electrical system. $S_{11}$ represents how much power is reflected from the antenna, and hence is known as the reflection coefficient. If $S_{11}$=0 dB, then all the power is reflected from the antenna, and nothing is radiated. The UHF antenna 100 may be tuned at other lower frequency bands by changing the capacitance values, thereby making the UHF antenna 100 more flexible to tune at other bands. Signal 302 represents the simulated values of s-parameters ($S_{11}$) when the reverse biased varactor diode 120 has a capacitance value of 1.32 picoFarads. Signal 304 represents the simulated values of s-parameters ($S_{11}$) when the reverse biased varactor diode 120 has a capacitance value of 1.47 picoFarads. Signal 306 represents the simulated values of s-parameters ($S_{11}$) when the reverse biased varactor diode 120 has a capacitance value of 2.32 picoFarads. Signal 308 represents the simulated values of s-parameters ($S_{11}$) when the reverse biased varactor diode 120 has a capacitance value of 5.39 picoFarads. Signal 310 represents the simulated values of s-parameters ($S_{11}$) when the reverse biased varactor diode 120 has a capacitance value of 6.28 picoFarads. Signal 312 represents the simulated values of s-parameters ($S_{11}$) when the reverse biased varactor diode 120 has a capacitance value of 9.63 picoFarads.

FIG. 3B is a graph 350 of measured reflection coefficient curves having s-parameters ($S_{11}$) at different reverse bias voltage values. Signal 352 represents the simulated values of s-parameters ($S_{11}$) when the reverse bias voltage values was 0 V. Signal 354 represents the simulated values of s-parameters ($S_{11}$) when the reverse bias voltage values was 1 V. Signal 356 represents the simulated values of s-parameters ($S_{11}$) when the reverse bias voltage values was 1.5 V. Signal 358 represents the simulated values of s-parameters ($S_{11}$) when the reverse bias voltage values was 5 V. Signal 360 represents the simulated values of s-parameters ($S_{11}$) when the reverse bias voltage values was 10 V. Signal 362 represents the simulated values of s-parameters ($S_{11}$) when the reverse bias voltage values was 15 V.

FIG. 3A and FIG. 3B depict the reflection coefficient curves produced for the UHF antenna 100 having varactor diode capacitance values ranging from 1.32 picoFarads −9.63 picoFarads and reverse bias voltage values ranging from 15 V to 0 V. As shown in FIG. 3A and FIG. 3B, from 300-450 MHz, a smooth change in the resonating bands was detected, with a −10 dB bandwidth of 17 MHz. The UHF antenna 100 is configured to provide wide frequency sweeping with narrowband operations at the UHF band for CubeSat.

Figure 4A:
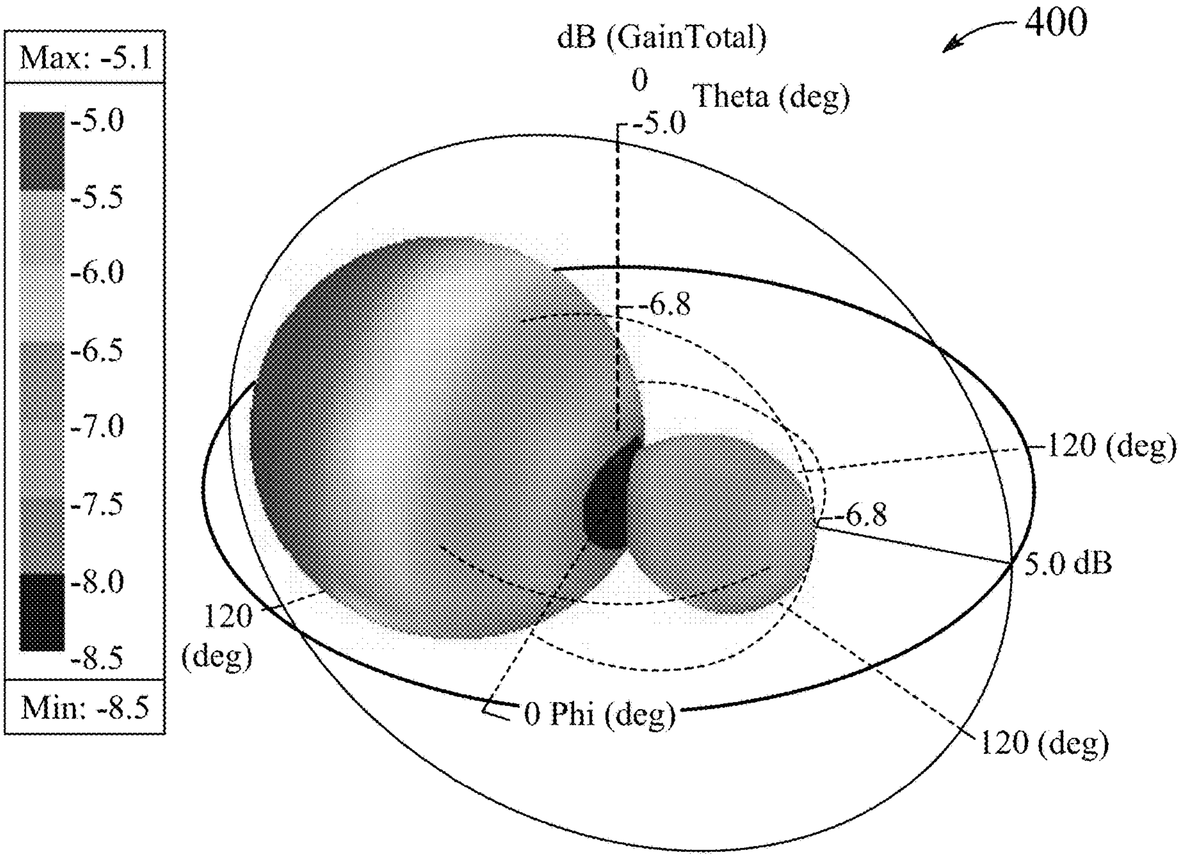
FIG. 4A is a graph of a three-dimensional (3-D) gain pattern of the FR slot-based UHF antenna at 300 MHz, according to certain embodiments.
Figure 4B:
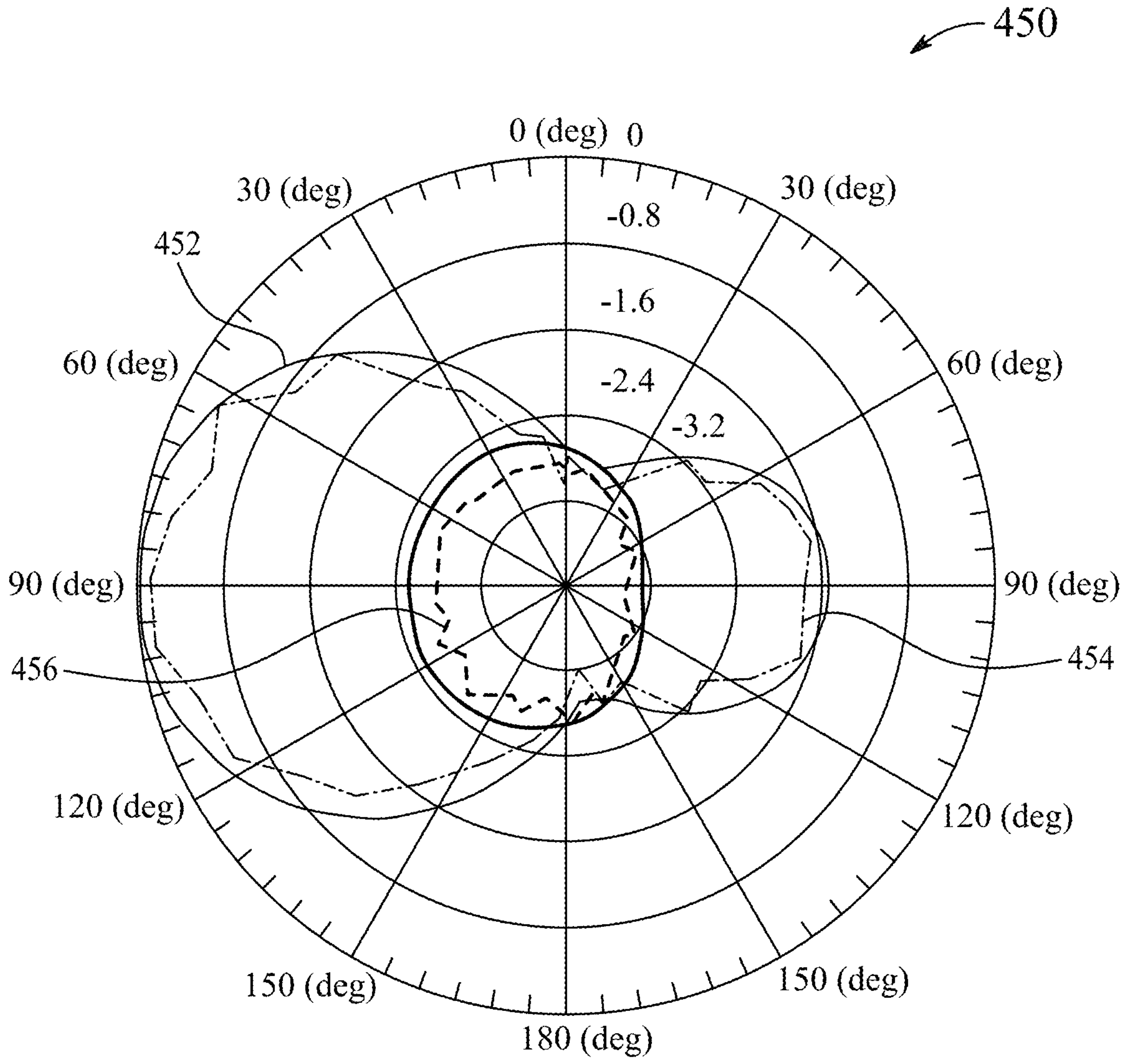
FIG. 4B is a graph of a two-dimensional (2-D) gain pattern of the FR slot-based UHF antenna at 300 MHz, according to certain embodiments.

FIG. 4A—FIG. 4B illustrate different simulated gain patterns of the UHF antenna 100 at 300 MHz. The UHF antenna 100 was characterized by its far-field radiation patterns and MIMO parameters. The peak gain and efficiency (% η) values were evaluated at 300 MHz. To understand the antenna's radiation pattern, in experimentation, each of the antenna elements was provided with input signals. FIG. 4A is a graph 400 of three-dimensional (3-D) gain pattern of the UHF antenna 100 at 300 MHz.

FIG. 4B is a graph 450 of a two-dimensional (2-D) gain pattern of the FR slot-based UHF antenna at 300 MHz. Signal 452 represents the simulated gain of the antenna showing a directivity in a range of −5 dB to −5.5 dB. Signal 454 represents the simulated gain of the antenna showing a directivity in a range of −6.5 dB to −7 dB. Signal 456 represents the simulated gain of the antenna showing a directivity in a range of −8 dB to −8.5 dB.

The performance of the UHF antenna 100 of the present disclosure was compared with the conventional antenna designs and is summarized in Table 1. It is observed from the Table 1 that the UHF antenna 100 is efficient in comparison to conventional antenna designs.

TABLE 1

Summary of performance comparison

| References | Antenna Size ($\lambda_0$) | Type of Antenna | FR | Gain (dB) | Frequency bands (MHz) | Bandwidth (MHz) |
|---|---|---|---|---|---|---|
| Azadegan et al. | 0.05 × 0.05 × 0.0787 | Slot | No | −3 | 300 | n/a |
| Tariq et al. | n/a | Slot | No | 2.73 | 485 | n/a |

TABLE 1-continued

| Summary of performance comparison | | | | | | |
|---|---|---|---|---|---|---|
| References | Antenna Size ($\lambda_0$) | Type of Antenna | FR | Gain (dB) | Frequency bands (MHz) | Bandwidth (MHz) |
| Vieira et al. | 0.102 × 0.216 × 0.004 | Slot | No | 5.2 | 401 | 8 |
| Zalfani et al. | 0.153 × 0.245 × 5.01 | Meandered Antenna | No | 1.8 | 920 | 10 |
| The present UHF antenna 100 | 0.150 × 0.150 | Slot | Yes | | 300 | n/a |

The UHF antenna 100 is configured to tune to multiple frequency bands using reactive loading. Hence, the UHF antenna 100 can emit at different direction at each resonating band.

The UHF antenna 100 is configured to provide continuous frequency band tuning, a simple feeding mechanism and a low profile antenna architecture.

The first embodiment is illustrated with respect to FIG. 1A—FIG. 1D. The first embodiment describes a frequency reconfigurable (FR) slot-based ultra-high frequency (UHF) antenna 100 for use in cubic shaped satellites (Cube-Sat). The UHF antenna 100 includes a dielectric circuit board 102 having a surface dimension of about 100 mm in length and about 100 mm in width, a top side 104, a bottom side 106, a first edge 108 opposite a second edge 110, and a third edge 112 opposite a fourth edge 114, a metallic layer 116 configured to cover the top side 104 of the dielectric circuit board 102, a meandered slot line M1 formed in the metallic layer 116, wherein the meandered slot line M1 comprises a heptagonal path (HP) connected to and enclosing a rectangular path (RP), wherein the meandered slot line M1 is configured to have mirror image geometry about a central axis (CP) which extends from the first edge 108 to the second edge 110, passes through an apex (A) of the heptagonal path (HP) and bisects the rectangular path, a feed horn 118 connected to the first edge 108 of the circuit board, wherein an open end of the feed horn 118 is directed towards the apex (A) of the heptagonal meandered path, a reverse biased varactor diode 120 connected to the metallic layer 116 across the rectangular path (RP) and parallel to the central axis (CP), a ground terminal 122 connected to the metallic layer, and a biasing circuit 124 configured to bias the reverse biased varactor diode 120 and cause the UHF antenna 100 to resonate in a frequency range of 300 MHz to 450 MHz.

In an aspect, the meandered slot line M1 has dimensions of about 80 mm×68 mm.

In an aspect, the biasing circuit 124 includes a first metallic sorting post 126 located on the bottom side 106, wherein the first metallic sorting post 126 is configured to extend through the dielectric circuit board 102 and connect to the reverse biased varactor diode 120 on the top side, a microstrip feedline 128 located on the bottom side 106, the microstrip feedline 128 configured to have a first end at the second edge 110 and a second end, a voltage source 134 connected to the first end of the microstrip feedline, a first inductor 136 connected in series with the voltage source 134, and a first resistor connected in series with the second inductor 142, wherein the second end of the microstrip feedline 128 is connected to the first metallic sorting post 126.

In an aspect, the UHF antenna 100 includes a second metallic sorting post 140 located on the bottom side 106, wherein the second metallic sorting post 140 is configured to extend through the dielectric circuit board 102 and connect to the metallic layer 116 on the top side, a second inductor 142 connected to the ground terminal 122, and a second resistor 144 connected in series with the second inductor 142, wherein the second resistor 144 is connected to the second metallic sorting post 140.

In an aspect, the heptagonal path (HP) includes a first leg extending from the apex (A) to the fourth edge 114 at a first angle, wherein the first angle is about 30 degrees with respect to a line which extends from the third edge 112 to the fourth edge 114, a second leg connected to the first leg, wherein the second leg extends parallel to the fourth edge 114, a third leg connected to the second leg, wherein the third leg forms a second angle with the second leg and extends towards the third edge, wherein the second angle is about 30 degrees, a fourth leg connected to the third leg, wherein the fourth leg extends towards the third edge 112 and is parallel to the second edge 110, a fifth leg connected to the fourth leg, where in the fifth leg forms a third angle with the fourth leg and extends towards the third edge, wherein the third angle is a negative of the second angle, a sixth leg connected to the fifth leg, wherein the sixth leg extends towards the first edge 108, and a seventh leg connected to the sixth leg at an angle equal to a negative of the first angle, wherein the seventh leg is connected to the first leg at the apex (A).

In an aspect, the rectangular path (RP) includes the fourth leg, an eighth leg connected to an intersection of the fourth leg and the third leg, wherein the eighth leg extends from the fourth leg towards the first edge 108 for about 55% of a distance between the fourth leg and the apex (A), a ninth leg connected to the eighth leg at a right angle, wherein the ninth leg extends from the eighth leg towards the third edge, and a tenth leg connected at a first end to the ninth leg at a right angle, wherein the tenth leg extends from the ninth leg towards the second leg, wherein the tenth leg is connected at a second end to an intersection of the fourth leg and the fifth leg.

In an aspect, the ninth leg is broken by a gap located at the central axis (CP), wherein the gap is about 1 mm in width.

In an aspect, the meandered slot line M1 is about 2 mm in width.

In an aspect, the reverse biased varactor diode 120 is selected to have a capacitance value in the range of 1.32 picoFarads to 9.63 picoFarads.

In an aspect, the reverse biased varactor diode 120 is selected to have a capacitance value of about 5.39 picoFarads.

In an aspect, the metallic layer 116 is copper.

The second embodiment is illustrated with respect to FIG. 1A—FIG. 1D. The second embodiment describes a method of forming a frequency reconfigurable (FR) slot-based ultra-high frequency (UHF) antenna 100 for use in cubic shaped satellites (Cube-Sat). The method includes obtaining a dielectric circuit board 102 having a surface dimension about 100 mm in length and about 100 mm in width, a top side, a bottom side 106, a first edge 108 opposite a second edge 110, and a third edge 112 opposite a fourth edge 114. The method includes covering the dielectric circuit board 102 with a metallic layer 116. The method includes etching, by laser milling, a meandered slot line M1 in the metallic layer 116, wherein the meandered slot line M1 comprises a heptagonal path (HP) connected to and enclosing a rectangular path, wherein the meandered slot line M1 is configured to have mirror image geometry about a central axis (CP) which extends from the first edge 108 to the second edge 110, passes through an apex (A) of the heptagonal path (HP) and bisects the rectangular path. The method includes connecting a feed horn 118 to the first edge 108 of the circuit board, wherein an open end of the first feed horn 118 is directed towards the apex (A) of the heptagonal meandered path (HP). The method includes connecting a reverse biased varactor diode 120 to the metallic layer 116 across the rectangular path (RP) and parallel to the central axis (CP). The method includes forming a biasing circuit 124 on the bottom side 106, wherein the biasing circuit 124 is configured to bias the reverse biased varactor diode. The method includes connecting a voltage supply to the biasing circuit. The method includes connecting a ground terminal 122 connected to the metallic layer, wherein the antenna resonates in a frequency range of 300 MHz to 450 MHz.

In an aspect, the method includes forming the biasing circuit 124 by installing a first metallic sorting post 126 on the bottom side 106, such that the first metallic sorting post 126 extends through the dielectric circuit board 102 and connects to the reverse biased varactor diode 120 on the top side, depositing a microstrip feedline 128 located on the bottom side 106, wherein the microstrip feedline 128 has a first end 130 at the second edge 110 and a second end 132, connecting a voltage source 134 to the first end of the microstrip feedline, connecting a first inductor 136 in series with the voltage source 134, connecting a first resistor 138 in series with the second inductor 142, and connecting the second end of the microstrip feedline 128 to the first metallic sorting post 126.

In an aspect, the forming the biasing circuit 124 further includes installing a second metallic sorting post 140 on the bottom side 106, such that the second metallic sorting post 140 extends through the dielectric circuit board 102 and connects to the metallic layer 116 on the top side 104. The method includes connecting a second inductor 142 to the ground terminal 122. The method includes connecting a first terminal of a second resistor 144 in series with the second inductor 142. The method includes connecting a second terminal of the second resistor 144 to the second metallic sorting post 140.

In an aspect, the etching the heptagonal path (HP) in the metallic layer 116 further includes etching a first leg extending from the apex (A) to the fourth edge 114 at a first angle, wherein the first angle is about 30 degrees with respect to a line which extends from the third edge 112 to the fourth edge 114. The method includes etching a second leg from the first leg towards the second edge 110, the second leg extending parallel to the fourth edge 114. The method includes etching a third leg from the second leg towards the third edge, such that the third leg forms a second angle with the second leg, wherein the second angle is about 30 degrees. The method includes etching a fourth leg from the third leg towards the third edge, wherein the fourth leg is parallel to the second edge 110. The method includes etching a fifth leg from to the fourth leg towards the third edge, where in the fifth leg forms a third angle with the fourth leg, wherein the third angle is a negative of the second angle. The method includes etching a sixth leg from the fifth leg towards the first edge 108. The method includes etching a seventh leg from the sixth leg to the apex (A) and connecting to the first leg, wherein the seventh leg extends from the sixth leg at an angle equal to a negative of the first angle.

In an aspect, the etching the rectangular path (RP) in the metallic layer 116 further includes etching an eighth leg from an intersection of the fourth leg and the third leg, towards the first edge 108 for about 55% of a distance between the fourth leg and the apex (A). The method further includes etching a ninth leg from the eighth leg towards the third edge, wherein the ninth leg makes at a right angle with the eighth leg, and wherein the ninth leg has a gap of about 1 mm located along the central axis (CP). The method further includes etching a tenth leg from the eighth leg towards an intersection of the fourth leg and the fifth leg, wherein the tenth leg makes a right angle with the ninth leg, and wherein the tenth leg connects to the intersection of the fourth leg and the fifth leg.

In an aspect, the method further includes selecting the reverse biased varactor diode 120 to have a capacitance value in the range of 1.32 picoFarads to 9.63 picoFarads.

The third embodiment is illustrated with respect to FIG. 1A—FIG. 1D. The third embodiment describes a method for transmitting ultra-high frequency (UHF) signals with a frequency reconfigurable (FR) slot-based ultra-high frequency (UHF) antenna 100 for use in cubic shaped satellites (Cube-Sat). The method includes connecting a source of the ultra-high frequency (UHF) signals to a feed horn 118 located on a frequency reconfigurable (FR) slot-based ultra-high frequency (UHF) antenna 100, wherein frequency reconfigurable (FR) slot-based ultra-high frequency (UHF) antenna 100 includes a dielectric circuit board 102, wherein the dielectric circuit board 102 has a surface dimension of about 100 mm in length and about 100 mm in width, a top side, a bottom side 106, a first edge 108 opposite a second edge 110, and a third edge 112 opposite a fourth edge 114, a metallic layer 116 configured to cover the top side 104 of the dielectric circuit board 102, a meandered slot line M1 formed in the metallic layer, wherein the meandered slot line M1 comprises a heptagonal path (HP) connected to and enclosing a rectangular path, wherein the meandered slot line M1 is configured to have mirror image geometry about a central axis (CP) which extends from the first edge 108 to the second edge 110, passes through an apex (A) of the heptagonal path (HP) and bisects the rectangular path, a reverse biased varactor diode 120 connected to the metallic layer across the rectangular path (RP) and parallel to the central axis (CP), and a ground terminal 122 connected to the metallic layer 116. The method includes positioning the feed horn 118 to direct an open end of the feed horn 118 towards the apex (A) of the heptagonal meandered path. The method includes biasing, with a biasing circuit, the reverse biased varactor diode 120 to cause the frequency reconfigurable (FR) slot-based ultra-high frequency (UHF) antenna to resonate in a frequency range of 300 MHz to 450 MHz.

In an aspect, the biasing, with the biasing circuit 124 includes applying a voltage, by a voltage source 134, to a first end of a microstrip feedline 128 located on the bottom side 106, wherein a second end of the microstrip feedline

128 is connected to a first metallic sorting post 126, wherein the first metallic sorting post 126 is configured to extend through the dielectric circuit board 102 and connect to the reverse biased varactor diode 120 on the top side, and wherein a first inductor 136 and a first resistor 138 are connected in series on the microstrip feedline. The method further includes sweeping a frequency of the voltage source 134 until the frequency reconfigurable (FR) slot-based ultra-high frequency (UHF) antenna resonates in the frequency range of 300 MHz to 450 MHz.

In an aspect, the method further includes grounding the metallic layer 116 on the top side 104 by connecting the metallic layer 116 to a second metallic sorting post 140, wherein the second metallic sorting post 140 is configured to extend through the dielectric circuit board 102. The method further includes connecting a second resistor 144 in series to the second metallic sorting post 140 on the bottom side 106. The method further includes connecting a second inductor 142 in series with the second resistor 144, wherein the second inductor 142 is connected to the ground terminal 122.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A frequency reconfigurable (FR) slot-based ultra-high frequency (UHF) antenna for use in cubic shaped satellites (Cube-Sat), comprising:
- a dielectric circuit board having a surface dimension of about 100 mm in length and about 100 mm in width, a top side, a bottom side, a first edge opposite a second edge, and a third edge opposite a fourth edge;
- a metallic layer configured to cover the top side of the dielectric circuit board;
- a meandered slot line formed in the metallic layer, wherein the meandered slot line comprises a heptagonal path connected to and enclosing a rectangular path, wherein the meandered slot line is configured to have mirror image geometry about a central axis which extends from the first edge to the second edge, passes through an apex of the heptagonal path and bisects the rectangular path;
- a feed horn to the first edge of the circuit board, wherein an open end of the feed horn is directed towards the apex of the heptagonal path;
- a reverse biased varactor diode connected to the metallic layer across the rectangular path and parallel to the central axis;
- a ground terminal connected to the metallic layer; and
- a biasing circuit configured to bias the reverse biased varactor diode and cause the frequency reconfigurable (FR) slot-based ultra-high frequency (UHF) antenna to resonate in a frequency range of 300 MHz to 450 MHz.

2. The FR slot-based UHF antenna of claim 1, wherein the meandered slot line has dimensions of about 80 mm×68 mm.

3. The FR slot-based UHF antenna of claim 1, wherein the biasing circuit comprises:
- a first metallic sorting post located on the bottom side, wherein the first metallic sorting post is configured to extend through the dielectric circuit board and connect to the reverse biased varactor diode on the top side;
- a microstrip feedline located on the bottom side, the microstrip feedline configured to have a first end at the second edge and a second end;
- a voltage source connected to the first end of the microstrip feedline;
- a first inductor connected in series with the voltage source; and
- a first resistor connected in series with the first inductor, wherein the second end of the microstrip feedline is connected to the first metallic sorting post.

4. The FR slot-based UHF antenna of claim 3, further comprising:
- a second metallic sorting post located on the bottom side, wherein the second metallic sorting post is configured to extend through the dielectric circuit board and connect to the metallic layer on the top side;
- a second inductor connected to the ground terminal; and
- a second resistor connected in series with the second inductor, wherein the second resistor is connected to the second metallic sorting post.

5. The FR slot-based UHF antenna of claim 1, wherein the heptagonal path includes:
- a first leg extending from the apex to the fourth edge at a first angle, wherein the first angle is about 30 degrees with respect to a line which extends from the third edge to the fourth edge;
- a second leg connected to the first leg, wherein the second leg extends parallel to the fourth edge;
- a third leg connected to the second leg, wherein the third leg forms a second angle with the second leg and extends towards the third edge, wherein the second angle is about 30 degrees;
- a fourth leg connected to the third leg, wherein the fourth leg extends towards the third edge and is parallel to the second edge;
- a fifth leg connected to the fourth leg, where in the fifth leg forms a third angle with the fourth leg and extends towards the third edge, wherein the third angle is a negative of the second angle;
- a sixth leg connected to the fifth leg, wherein the sixth leg extends towards the first edge; and
- a seventh leg connected to the sixth leg at an angle equal to a negative of the first angle, wherein the seventh leg is connected to the first leg at the apex.

6. The FR slot-based UHF antenna of claim 5, wherein the rectangular path includes:
- the fourth leg;
- an eighth leg connected to an intersection of the fourth leg and the third leg, wherein the eighth leg extends from the fourth leg towards the first edge for about 55% of a distance between the fourth leg and the apex;
- a ninth leg connected to the eighth leg at a right angle, wherein the ninth leg extends from the eighth leg towards the third edge; and
- a tenth leg connected at a first end to the ninth leg at a right angle, wherein the tenth leg extends from the ninth leg towards the second leg, wherein the tenth leg is connected at a second end to an intersection of the fourth leg and the fifth leg.

7. The FR slot-based UHF antenna of claim 6, wherein the ninth leg is broken by a gap located at the central axis, wherein the gap is about 1 mm in width.

8. The FR slot-based UHF antenna of claim 1, wherein the meandered slot line is about 2 mm in width.

9. The FR slot-based UHF antenna of claim 1, wherein the reverse biased varactor diode is selected to have a capacitance value in the range of 1.32 picoFarads to 9.63 picoFarads.

10. The FR slot-based UHF antenna of claim 1, wherein the reverse biased varactor diode is selected to have a capacitance value of about 5.39 picoFarads.

11. The FR slot-based UHF antenna of claim 1, wherein the metallic layer is copper.

12. A method of forming a frequency reconfigurable (FR) slot-based ultra-high frequency (UHF) antenna for use in cubic shaped satellites (Cube-Sat), comprising:

obtaining a dielectric circuit board having a surface dimension about 100 mm in length and about 100 mm in width, a top side, a bottom side, a first edge opposite a second edge, and a third edge opposite a fourth edge;

covering the dielectric circuit board with a metallic layer;

etching, by laser milling, a gap portion between a first portion and a second portion of the bottom side;

etching, by laser milling, a meandered slot line in the metallic layer, wherein the meandered slot line comprises a heptagonal path connected to and enclosing a rectangular path, wherein the meandered slot line is configured to have mirror image geometry about a central axis which extends from the first edge to the second edge, passes through an apex of the heptagonal path and bisects the rectangular path;

connecting a feed horn to the first edge of the circuit board, wherein an open end of the first feed horn is directed towards the apex of the heptagonal path;

connecting a reverse biased varactor diode to the metallic layer across the rectangular path and parallel to the central axis;

forming a biasing circuit on the bottom side, wherein the biasing circuit is configured to bias the reverse biased varactor diode;

connecting a voltage supply to the biasing circuit; and connecting a ground terminal connected to the metallic layer, wherein the frequency reconfigurable (FR) slot-based ultra-high frequency (UHF) antenna resonates in a frequency range of 300 MHz to 450 MHz.

13. The method of claim 12, further comprising:

forming the biasing circuit by:

installing a first metallic sorting post on the bottom side, such that the first metallic sorting post extends through the dielectric circuit board and connects to the reverse biased varactor diode on the top side;

depositing a microstrip feedline located on the bottom side, wherein the microstrip feedline has a first end at the second edge and a second end;

connecting a voltage source to the first end of the microstrip feedline;

connecting a first inductor in series with the voltage source;

connecting a first resistor in series with the first inductor; and connecting the second end of the microstrip feedline to the first metallic sorting post.

14. The method of claim 13, wherein forming the biasing circuit further comprises:

installing a second metallic sorting post on the bottom side, such that the second metallic sorting post extends through the dielectric circuit board and connects to the metallic layer on the top side;

connecting a second inductor to the ground terminal; and connecting a first terminal of a second resistor in series with the second inductor; and connecting a second terminal of the second resistor to the second metallic sorting post.

15. The method of claim 13, wherein etching the heptagonal path in the metallic layer comprises:

etching a first leg extending from the apex to the fourth edge at a first angle, wherein the first angle is about 30 degrees with respect to a line which extends from the third edge to the fourth edge;

etching a second leg from the first leg towards the second edge, the second leg extending parallel to the fourth edge;

etching a third leg from the second leg towards the third edge, such that the third leg forms a second angle with the second leg, wherein the second angle is about 30 degrees;

etching a fourth leg from the third leg towards the third edge, wherein the fourth leg is parallel to the second edge;

etching a fifth leg from to the fourth leg towards the third edge, where in the fifth leg forms a third angle with the fourth leg, wherein the third angle is a negative of the second angle;

etching a sixth leg from the fifth leg towards the first edge; and etching a seventh leg from the sixth leg to the apex and connecting to the first leg, wherein the seventh leg extends from the sixth leg at an angle equal to a negative of the first angle.

16. The method of claim 15, wherein etching the rectangular path in the metallic layer comprises:

etching an eighth leg from an intersection of the fourth leg and the third leg, towards the first edge for about 55% of a distance between the fourth leg and the apex;

etching a ninth leg from the eighth leg towards the third edge, wherein the ninth leg makes at a right angle with the eighth leg, and wherein the ninth leg has a gap of about 1 mm located along the central axis; and etching a tenth leg from the eighth leg towards an intersection of the fourth leg and the fifth leg, wherein the tenth leg makes a right angle with the ninth leg, and wherein the tenth leg connects to the intersection of the fourth leg and the fifth leg.

17. The method of claim 12, further comprising:

selecting the reverse biased varactor diode to have a capacitance value in the range of 1.32 picoFarads to 9.63 picoFarads.

18. A method for transmitting ultra-high frequency (UHF) signals with a frequency reconfigurable (FR) slot-based ultra-high frequency (UHF) antenna for use in cubic shaped satellites (Cube-Sat), comprising:

connecting a source of the ultra-high frequency (UHF) signals to a feed horn located on a frequency reconfigurable (FR) slot-based ultra-high frequency (UHF) antenna, wherein frequency reconfigurable (FR) slot-based ultra-high frequency (UHF) antenna includes:

a dielectric circuit board, wherein the dielectric circuit board has a surface dimension of about 100 mm in length and about 100 mm in width, a top side, a bottom side, a first edge opposite a second edge, and a third edge opposite a fourth edge;

a metallic layer configured to cover the top side of the dielectric circuit board;

a meandered slot line formed in the metallic layer, wherein the meandered slot line comprises a heptagonal path connected to and enclosing a rectangular path, wherein the meandered slot line is configured to have mirror image geometry about a central axis which extends from the first edge to the second edge, passes through an apex of the heptagonal path and bisects the rectangular path;

a reverse biased varactor diode connected to the metallic layer across the rectangular path and parallel to the central axis;

a ground terminal connected to the metallic layer;

positioning the feed horn to direct an open end of the feed horn towards the apex of the heptagonal path; and biasing, with a biasing circuit, the reverse biased varactor diode to cause the frequency reconfigurable (FR) slot-based ultra-high frequency (UHF) antenna to resonate in a frequency range of 300 MHz to 450 MHz.

19. The method of claim 18, wherein biasing, with the biasing circuit, comprises:

applying a voltage, by a voltage source, to a first end of a microstrip feedline located on the bottom side, wherein a second end of the microstrip feedline is connected to a first metallic sorting post, wherein the first metallic sorting post is configured to extend through the dielectric circuit board and connect to the reverse biased varactor diode on the top side, and wherein a first inductor and a first resistor are connected in series on the microstrip feedline; and sweeping a frequency of the voltage source until the frequency reconfigurable (FR) slot-based ultra-high frequency (UHF) antenna resonates in the frequency range of 300 MHz to 450 MHz.

20. The method of claim 19, further comprising:

grounding the metallic layer on the top side by connecting the metallic layer to a second metallic sorting post, wherein the second metallic sorting post is configured to extend through the dielectric circuit board;

connecting a second resistor in series to the second metallic sorting post on the bottom side; and connecting a second inductor in series with the second resistor, wherein the second inductor is connected to the ground terminal.

* * * * *